United States Patent [19]
Asmussen

[11] 3,988,687
[45] Oct. 26, 1976

[54] STEP-SERVOED TONE DETECTOR

[75] Inventor: Daniel Richard Asmussen, Kirkland, Wash.

[73] Assignee: Tel-Tone Corporation, Kirkland, Wash.

[22] Filed: July 18, 1975

[21] Appl. No.: 597,309

[52] U.S. Cl. ............................. 328/167; 328/119; 328/133; 328/155; 329/126; 333/70 R
[51] Int. Cl.² ..................... H04B 15/00; H03K 9/06
[58] Field of Search ........... 328/167, 155, 140, 119, 328/133; 333/16 R, 70 R; 329/126

[56] References Cited
UNITED STATES PATENTS

| | | | |
|---|---|---|---|
| 3,436,647 | 4/1969 | Gobeli et al. | 328/155 |
| 3,539,829 | 11/1970 | Langendorf et al. | 328/167 X |
| 3,555,435 | 1/1971 | Vosteen | 328/140 |
| 3,628,057 | 12/1971 | Mueller | 328/167 X |
| 3,714,588 | 1/1973 | Deboo et al. | 328/167 |

Primary Examiner—John S. Heyman
Attorney, Agent, or Firm—Christensen, O'Connor, Garrison & Havelka

[57] ABSTRACT

An incoming signal (tone) and the feedback signal of a biquadratic filter are converted into square waves by zero crossing comparators. The phase state of the square waves is decoded and the decoded result is phase compared to determine if a 90° phase shift exists between the incoming and feedback signals. If a 90° phase shift does not exist, a counter is incremented or decremented, depending upon whether the phase comparison indicates that frequency of the incoming signal is greater, or less than the feedback signal. The output of the counter is decoded and utilized through a switching circuit to control the center frequency of the biquadratic filter (determined by the impedance of its feedback path). The switching circuit changes the impedance of the feedback path so that the center frequency is moved toward the frequency of the incoming signal. When the center frequency of the biquadratic filter is at the frequency of the incoming signal, the output of the frequency decoder provides a coded indication of the frequency of the incoming signal.

14 Claims, 3 Drawing Figures

Fig. 2.

STEP-SERVOED TONE DETECTOR

BACKGROUND OF THE INVENTION

This invention is directed to electronic detectors and, more particularly, to electronic detectors for determining which tone of particular set of tones exists in a received or incoming signal, such as a signal of the type generated by a push bottom type telephone.

In various types of electronic systems, it is important to determine which tone of a series of tones exists in an incoming signal. For example, in telephone tone-to-pulse conversion systems adapted to convert dual tone or DMT signals of the type generated by push bottom telephones into rotary dial type pulses, it is necessary to identify the frequencies of a pair of received tones and utilize information about these frequencies to control the generation of rotary dial type pulses. More specifically, when a button of a push button telephone is depressed, a dual tone multifrequency frequency (DTMF) signal is generated. One of the dual tones is a high frequency tone and the other tone is a low frequency tone. It is relatively easy to segregate the high frequency tones from the low frequency tones. However, it is difficult to determine which particular tone of a set of low frequency tones (or a set of high tones) actually exists. Various types of relatively sophisticated electronic circuitry have been developed to determine this information. Such circuits usually include relatively complex signal filters and level detectors, or digital counters and memory systems for determining and verifying this information. Obviously, highly sophisticated electronic systems are expensive to manufacture and produce, whereby the cost of tone-to-pulse conversion is greater than desirable. This invention is directed to overcoming these disadvantages and provide a relatively uncomplicated tone detector suitable for detecting which tone of a particular set of high or low frequency tones actually exists.

Therefore, it is an object of this invention to provide a new and improved tone detector.

It is a further object of this invention to provide a new and improved tone detector suitable for use in tone-to-pulse or tone-to-mark conversion systems.

It is yet another object of this invention to provide a tone detector suitable for use in telephone systems adapted to convert DTMF signals into signal forms required by rotary dial operated signaling or switching systems.

SUMMARY OF THE INVENTION

In accordance with principles of this invention, a step-servoed tone detector is provided. The step-servoed tone detector comprises a biquadratic filter, a phase comparing system and a control system. The phase comparing system compares the input signal applied to the biquadratic filter with the feedback signal of the biquadratic filter and provides an output indicative of the frequency relationship between these two signals. The control circuit senses the output of the phase comparing system and, in accordance therewith, controls the impedance of the feedback path of the biquadratic filter. If the output of the phase comparing system indicates that the two signals do not approach a 90° out-of-phase relationship, the control system varies the feedback impedance such that the center frequency of the biquadratic filter is stepped toward the frequency of the incoming signal. When approximately a 90° phase relationship exists, the output of the control system provides a coded indication of the stepped position of the biquadratic filter and, thus, the frequency (tone) of the incoming signal.

In accordance with further principles of this invention, the control system includes an increment/decrement counter that increases or decreases its count in accordance with the output of the phase comparing system, and a switching circuit. The output of the increment/decrement counter is frequency decoded, and the results of the decoding is utilized, via the switching circuit, to control the impedance of the feedback path to the biquadratic filter.

In accordance with other principles of this invention, the phase comparing system comprises: zero crossing comparators adapted to convert the incoming signal and the feedback signal of the biquadratic filter into square waves, and their complements; a phase state decoder; and a phase comparator. The square waves and their complements are decoded by the phase state decoder and the results are compared in the phase comparator. The phase comparator generates high and low output signals. These signals are used by a gate circuit, forming part of the control system, to increment, decrement or stop the increment/decrement counter depending upon whether or not the incoming signal frequency and the biquadratic filter center frequency are nearly equal, or one is higher or lower than the other.

In accordance with still further principles of this invention, the phase comparator includes an integrator adapted to integrate selected outputs of the phase state decoder. Initially, the integrator has a slow charging rate. The pass band of the invention is narrowed by changing the integration rate during a second cycle of operation occurring after a first cycle has indicated that the desired comparison between the frequency of the incoming tone and the passband of the biquadratic filter exists.

It will be appreciated from the foregoing summary that the invention provides a new and improved tone detector for detecting which tone, of a set of tones, exists in an incoming signal. The tone detector of the invention is a step-servoed tone detector that includes a biquadratic filter whose center frequency is stepped from level to level until it is equal, within a very small range, to the frequency (tone) of the incoming signal. When this state is reached, a coded output signal related to the frequency of the incoming tone signal is enabled to downstream utilization circuitry.

In an overall tone detection system, a first stepservoed tone detector formed in accordance with the invention is utilized to detect which tone of a plurality of high frequency tones, and a second is utilized to detect which tone of a series of low frequency tones, exists in an incoming DTMF signal after the signal has been split by filters and channeled to the two detectors. The end result, after the two biquadratic filters are step-servoed to the necessary positions, is two coded outputs that uniquely represent which button of a pushbutton telephone was depressed to generate the original DTMF signal. The resultant coded signals can be readily utilized to create an appropriate control signal for succeeding switching equipment.

It will be appreciated that the invention overcomes the prior art problems noted above. Specifically, the invention provides an uncomplicated, yet reliable, tone detector that does not require sophisticated and complex filtering or counting circuitry of the type utilized in many prior art tone detectors. Consequently, the invention, because it is less complicated, is relatively inexpensive to manufacture and produce.

BRIEF DESCRIPTION OF THE DRAWINGS

The foregoing objects and many of the attendant advantages of this invention will become more readily appreciated as the same becomes better understood by reference to the following detailed description when taken in conjunction with the accompanying drawings wherein.

DESCRIPTION OF THE PREFERRED EMBODIMENT

Figure 1:
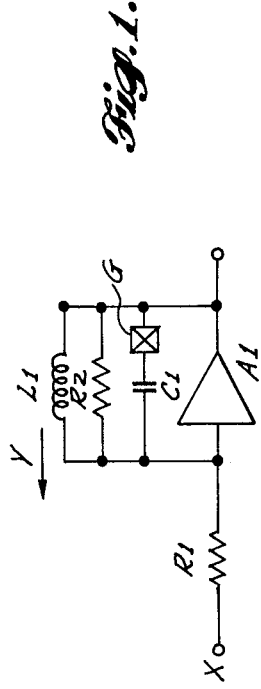
FIG. 1 is a schematc diagram of a biquadratic filter.

Prior to describing a preferred embodiment of the invention, a brief desciption of the operation of a biquadratic filter is presented. FIG. 1 is a simplified, schematic diagram of two biquadratic filter and includes: an amplifier designated A1; two resistors designated R1 and R2; a capacitor designated C1; a gain control designated G; and an inductor designated L1. An input signal received at a terminal designated X is applied through R1 to the input of A1. L1, R2 and C1 (in series with G) are all connected in parallel between the input and the output of A1.

In operation, when the frequency of the input signal is at the center frequency of the biquadratic filter (determined by the combined impedance of the feedback elements L1, R2 and C1), it is 90° out of phase with the inductive feedback current, i.e., the current represented by arrow Y. If this frequency relationship does not exist, the phase quadrature relationship does not exist. The present invention takes advantage of this 90° phase relationship, and utilizes it to create a tone detector adapted to detect which tone of a set of tones exists in an incoming signal. If the desired phase relationship does not exist, the tone detector is step-servoed toward the desired phase relationship. The tone detector is step-servoed by varying the feedback gain in the capacitive leg of the biquadratic filter in a step manner such that the center frequency of the biquadratic filter is moved toward the frequency of the incoming signal. When the desired 90° phase relationship is sensed, a coded output representing the impedance "position" of the feedback circuit provides an indication of the frequency of the tone.

Figure 2:
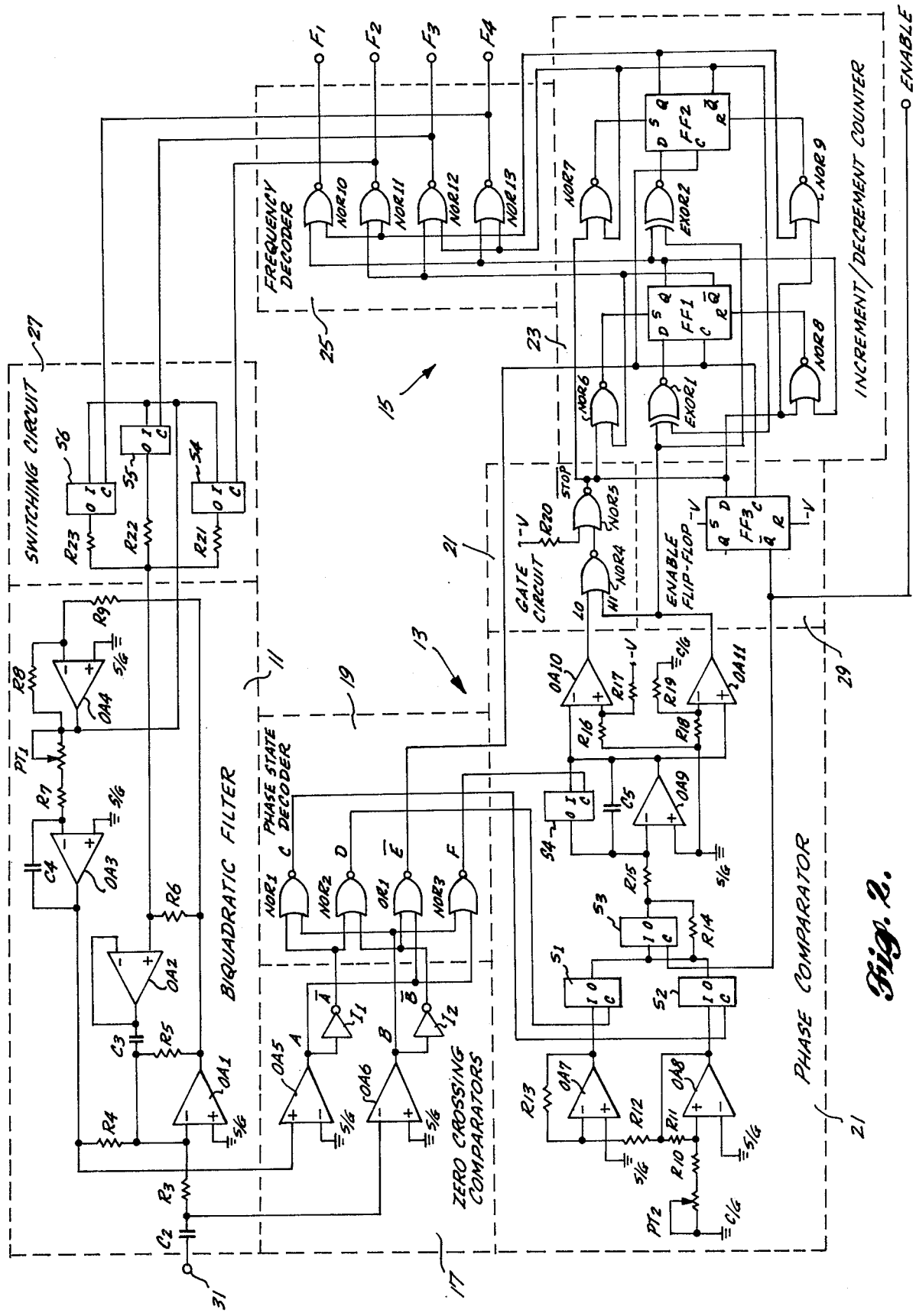
FIG. 2 is a schematic diagram of a preferred embodiment of the invention.

FIG. 2 is a schematic diagram of a preferred embodiment of the invention and comprises: a biquadratic filter 11; a phase comparing system 13; and, a control system 15. The phase comparing system 13 comprises: a zero crossing comparator 17; a phase state decoder 19; and, a phase comparator 21. The control system 15 comprises: a gate circuit 21; an increment/decrement counter 23; a frequency decoder 25; a switching circuit 27; and an enable flip-flop circuit 29.

The biquadratic filter 11 receives an incoming signal at input terminal 31. This signal is also applied to the zero crossing comparators. The zero crossing comparators also receive the feedback signal of the biquadratic filter 11. The zero crossing comparators convert their incoming signal into square wave output signals A and B, and their complements $\overline{A}$ and $\overline{B}$. The A signals relate to the feedback signals and the B signals relate to the incoming signals. These signals are received by the phase state decoder 19 and converted into output singals C, D, $\overline{E}$ and F. Signals C and D relate to the phase of signals A and B and are phase compared by the phase comparator 21. Signal $\overline{E}$ is a clock signal adapted to clock the increment/decrement counter 23 and the enable flip-flop 29. Signal F is adapted to reset an integrating capacitor forming part of the phase comparator, and more fully hereinafter described, once each cycle of operation.

If the phase comparator senses that the frequency of the incoming signal or tone is less than the center frequency of the biquadratic filter 11, a low output signal is generated i.e., a signal designated LO achieves a binary one state. If the frequency of the incoming signal is greater than the center frequency of the biquadratic filter, a high output signal is generated i.e., a signal designated HI achieves a binary one state. HI and LO are essentially complementary in that one is always the opposite of the other, except when the center frequency of the biquadratic filter is very near the frequency of the received tone. In that range both HI and Lo are binary zeroes. HI is applied to the increment/decrement counter causing it to be incremented or decremented upon the occurrence of a clock signal ($\overline{E}$) generated by the phase state decoder 19, unless stopped by the gate circuit 21. The gate circuit 21 receives both HI and Lo and generates a $\overline{STOP}$ signal. $\overline{STOP}$ is in a binary one state unless HI and LO are both binary zeroes. When this condition occurs $\overline{STOP}$ achieves a binary zero state and inhibits the increment/decrement counter.

The output of the increment/decrement counter is decoded by the frequency decoder 25. The output of the frequency decoder creates four parallel binary signals designated F1-F4 in decreasing order of frequency. F2-F4 are applied to the switching circuit 27 and control the feedback impedance of the biquadratic filter, which in turn controls its center frequency. Thus, when the increment/decrement counter output is changed, the center frequency of the biquadratic filter is also changed. The change is such that the center frequency of the biquadratic filter 11 is moved toward the frequency of the tone received at terminal 31. When these two frequencies are the same, within the established range, the enable flip-flop circuit creates an enable signal that enables the output of the frequency decoder to downstream circuitry adapted to use the F1-F4 information. More precisely, the enable circuit not only applies an enable pulse to downstream circuitry, it also narrows the passband of the invention by changing the charging rate of an integrator forming part of the phase comparator. Thus, the phase comparator is changed from a coarse mode of operation to a fine mode of operation. If the enable flip-flop remains enabled through a second (and possibly subsequent) sequence of detection, the downstream circuitry is actually enabled to read F1-F4.

Turning now to a more detailed description of the preferred embodiment of the invention; as illustrated in FIG. 2, the biquadratic filter 11 comprises: four operational amplifiers designated OA1-OA4; three capacitors designated C2, C3 and C4; seven resistors designated R3-R9; and, a potentiometer designated PT1. The tone received at terminal 31 is applied through coupling capacitor C2 in series with R3 to the inverting input of OA1. The noninverting input of OA1 is connected to signal ground (S/G). R5 is connected between the output of OA1 and its inverting input. OA1 forms the amplifier of the biquadratic filter (i.e., it performs the function of A1 of FIG. 1); and, R5 forms the passband (Q) determining portion of the feedback resistance.

The output of OA1 is connected through R6 to the noninverting input of OA2 and through R9 to the inverting input of OA4. The inverting input of OA2 is connected to its output. The output of OA2 is connected through C3 to the inverting input of OA1. As will be recognized by those skilled in the art, C3 and OA2 form the capacitive branch of the feedback path of the biquadratic filter 11.

The noninverting input of OA4 is connected to signal ground. The output of OA4 is connected through R8 to its inverting input and through PT1 in series with R7 to the inverting input of OA3. The noninverting input of OA3 is connected to signal ground. The output of OA3 is connected through C4 to its inverting input, and through R4 to the inverting input of OA1.

It will be appreciated by those skilled in the art and others that OA3 and OA4 and their related circuit elements C4, R7–R9 and PT1 form a gyrator. A gyrator, as will be readily understood by those skilled in the electronics art, is a non-inductive electronic circuit that performs the electronic function of an inductor. Thus, OA3 and OA4 and their related components form the inductive feedback branch of the biquadratic filter.

The zero crossing comparators 17 comprise: two operational amplifiers designated OA5 and OA6; and, two inverters designated I1 and I2. The output of OA3 (the output of the inductive branch of the biquadratic filter feedback circuit) is connected to the noninverting input of OA5. The inverting input of OA5 is connected to the signal ground. The output of OA5 is the square wave signal designated A. This signal is applied to the input of I1, whereby the output of I1 is the complement of A, or $\bar{A}$. The junction between C2 and R3 is connected to the inverting input of OA6. Thus, OA6 receives the incoming tone. The non-inverting input of OA6 is connected to signal ground. The output of OA6 is the square wave signal designated B. This signal is applied to the input of I2, whereby the output of I2 is the complement of B, or $\bar{B}$.

It will be appreciated from the foregoing description that the zero crossing comparators are, basically, squaring circuits. They receive the feedback signal, in the case of OA5, and incoming tone, in the case of OA6, and convert these signals into square waves, and the complements thereof. As noted above, A is a square wave representation of the feedback signal and B is a square wave representation of the incoming tone.

The phase state decoder 19 comprises: three two-input NOR gates designated NOR1, NOR2 and NOR3; and a two-input Or gate designated OR1. The A output of the zero crossing comparators 17 is applied to one input of OR1 and to one input of NOR3. The $\bar{A}$ output is applied to one input of NOR1 and one input of NOR2. The B output of the zero crossing comparators is applied to the second input of NOR1 and the second input of NOR3. And, the $\bar{B}$ output is applied to the second input of OR1 and the second input of NOR2. The output of NOR1 is the signal designated C, the output of NOR2 is the signal designated D, the output of OR1 is the signal designated $\bar{E}$ and the output of NOR3 is the signal designated F. As briefly noted above, signals C and D represent the phase state of the outputs of the zero crossing detectors, signal $\bar{E}$ is a clocking signal used by the increment/decrement counter and the enable flip-flop 29 in the manner hereinafter described. Signal F is a reset signal applied to the phase comparator that resets a phase integrator forming a portion of the phase comparator.

The phase comparator 21 comprises: five operational amplifiers designated OA7–OA11; four switches designated S1–S4; a potentiometer designated PT2; ten resistors designated R10–R19; and a capacitor designated C5. The noninverting input of OA8 is connected through PT2 in series with R10 to chassis ground (C/G). The inverting input of OA8 is connected to signal ground (S/G). The output of OA8 is connected through R11 to its input, through R12 to the inverting input of OA7 and to the input (I) of S2. The noninverting input of OA7 is connected to signal ground. The output of OA7 is connected through R13 to its inverting input and to the input (i) terminal of S1. The C output of the phase state decoder 19 is applied to the clock (C) terminal of S2 and the D output is applied to the clock (C) terminal of S1. (It is noted here that the switches forming a portion of the phase comparator, i.e. S1–S4, as well as the other switches hereinafter described, are electronic switches that connect their inputs to their outputs when they are gated on by a suitable clock signal being applied to their C terminals.)

The output (O) terminals of S1 and S2 are both connected to the input (I) terminal of S3. The output (O) terminal of S3 is connected through R14 to its input (I) terminal and through R15 to the inverting input of OA9. The noninverting input of OA9 is connected to signal ground. The output of OA9 is connected through C5 to its inverting input, the input (I) terminal of S4, the inverting input of OA10 and the noninverting input of OA11. The output (O) terminal of S4 is connected to the inverting input of OA9. The clock (c) terminal of S4 receives the F signal output of the phase state decoder 19.

The noninverting input of OA10 is connected through R17 to a power source designated −V and through R16 to signal ground. The inverting input of OA11 is connected through R19 to chassis ground and through R18 to signal ground. The output of OA10 is the signal designated LO for low. the output of OA11 is the signal designated HI for high.

Figure 3:
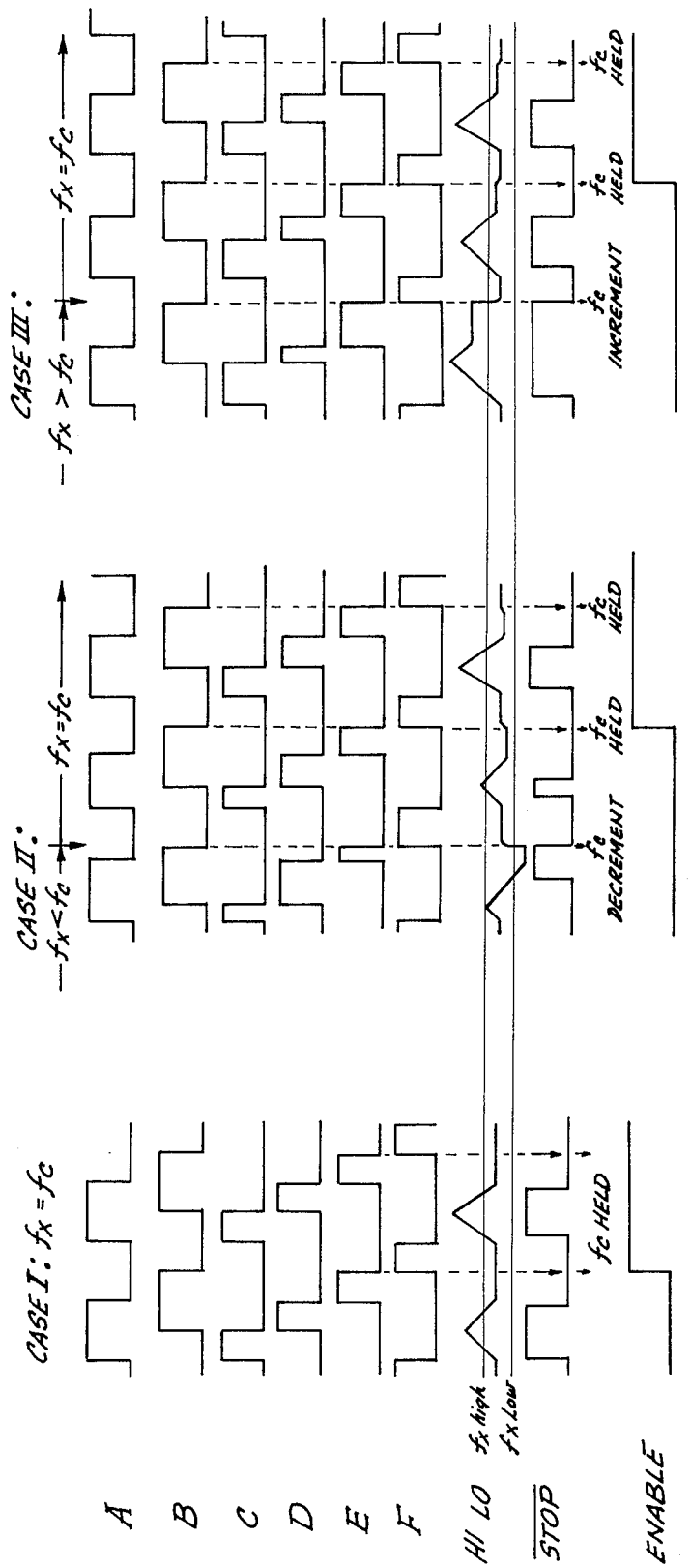
FIG. 3 is a series of waveform diagrams depicting different sequences of operation for the embodiment of the invention illustrated in FIG. 2.

It will be appreciated from viewing FIG. 2 and the previous description thereof that R15, C5 and OA9 form an integrator. OA7 and OA8 form tracking voltage sources of opposite polarity for the integrator. The voltage across C5 is increased and decreased in magnitude in accordance with the time that S1 and S2 are closed. PT2 controls the voltage rate-of-change of the integrator which increases as PT2 decreases in resistance. The closure times of S1 and S2 are, obviously, related to the time that square waves C and D are in one of their states, preferably their positive state. If the biquadratic filter is at a center frequency substantially equal to the frequency of the incoming signal or tone, square waves C and D, as illustrated on the left side of FIG. 3, are nearly equal in duration. Thus, the capacitor C5 is charged and discharged by a nearly equal amount during a complete cycle of operation and, at some chosen point in the cycle approaches zero. If, on the other hand, the center frequency of the biquadratic filter is different than the frequency of the incoming tone, the voltage across C5 is some value, either higher or lower, than the chosen value at the chosen point in the cycle. The chosen point is, of course, the point at which the output of the phase comparator is "read". The voltage across C5 is continuously sensed by OA10 and OA11. OA10 and OA11 create output signals designated LO and HI, respectively. LO and HI are received by the gate circuit 21 and create an increment-/decrement control signal that is clocked to the increment/decrement counter in the manner hereinafter described.

S3 controls the charging (or discharging) rate of C5 and, thus, the passband of the invention. Normally S3 is open and R14 and R15 are connected to the inverting input of OA9. This is the coarse mode of operation. When it is desired to narrow the passband of the invention S3 is activated to short R14. This shunting action occurs when the enable flip-flop 29 is activated in the manner hereinafter described.

The gate 21 comprises: two two-input NOR gates designated NOR4 and NOR5; and, a resistor designated R20. The output of OA10 (LO) is applied to one input of NOR4 and the output of OA11 (HI) is applied to the circuit 21 input of NOR4. The output of NOR4 is applied to one input of NOR5. −V is applied through R20 to the second input of NOR5. The output of NOR5 is a signal designated $\overline{STOP}$. This signal basically informs the increment/decrement counter whether or not LO and HI are binary zeroes or whether or not one of them is a binary one. If they are not both binary zeroes, when clocked, the increment/decrement counter increments or decrements depending on the binary status of HI, as hereinafter described.

The increment/decrement counter 23 comprises: four two-input NOR gates designated NOR6, NOR7, NOR8 and NOR9; two two-input exclusive OR gates designated EXOR1 and EXOR2; and, two D flip-flops designated FF1 and FF2. The $\overline{STOP}$ signal is applied to one input of NOR6, one input of NOR7, one input of NOR8, and one input of NOR9. HI from the phase comparator is applied to one input of EXOR1 and one input of EXOR2. The output of EXOR1 is applied to the data (D) input of FF1 and the output of EXOR2 is applied to the data (D) input of FF2. The $\overline{Q}$ output of FF1 is applied to the second input of NOR6. The Q output of FF1 is applied to the second input of EXOR2 and the second input of NOR8. The $\overline{Q}$ output of FF2 is applied to the second input of NOR7 and the second input of EXOR1. The Q output of FF2 is applied to the second input of NOR9. The output of NOR6 is applied to the set (S) input of FF1 and the output of NOR7 is applied to the set (S) input of FF2. The output of NOR8 is applied to the reset (R) of FF1 and the output of NOR9 is applied to reset (R) input of FF2. The clock (C) inputs of FF1 and FF2 receive the $\overline{E}$ signal output of the phase state decoder 19.

It will be appreciated from the foregoing description and viewing FIG. 2 that the increment/decrement counter is the type of counter that is commonly known in the digital logic art as a Johnson counter. When clocked by the $\overline{E}$ signal, the outputs of EXOR1 and EXOR2 are shifted into FF1 and FF2 unless these signals are overridden by binary one signals applied to the set and reset inputs of FF1 and FF2. More specifically, assuming first that $\overline{STOP}$ is in a binary one state when the trailing edge of $\overline{E}$ goes to zero (cases II or III of FIG. 3). When this set of conditions exist, HI is clocked into FF1 and the Q output of FF1 is clocked into FF2 causing the overall increment/decrement counter to increment or decrement. If HI was zero, the counter is decremented i.e., if $f_x$ (the incoming signal) $< f_c$ (the center frequency), then the counter is decremented. This is case II of FIG. 3. If HI was one, the counter is incremented i.e., if $f_x > f_c$, then the counter is incremented. When HI and LO are both at binary zero states when the trailing edge of $\overline{E}$ occurs (case I), $\overline{STOP}$ is at a binary zero state. This binary zero state in combination with a zero output of one of the Q or $\overline{Q}$ outputs of both FF1 and FF2, through some two gate combination of NOR6-NOR9, applies a binary one to either the set or the reset inputs of FF1 and FF2 inhibiting their counting of the output of EXOR1 and EXOR2.

The frequency decoder 25 comprises: four two-input NOR gates designated NOR10, NOR11, NOR12 and NOR13. The Q output of FF1 is applied to one input of NOR10 and one input of NOR13. The $\overline{Q}$ output of FF1 is applied to one input of NOR11 and one input of NOR12. The Q output of FF2 is applied to the second input of NOR10 and the second input of NOR11. The $\overline{Q}$ output of FF2 is applied to the second input of NOR12 and the second input of NOR13.

The output of NOR10 is the signal designated F1, the output of NOR11 is the signal designated F2, the output of NOR12 is the signal designated F3 and the output of NOR13 is the signal designated F4. The frequency decoder 25 merely decodes the Q and $\overline{Q}$ outputs of FF1 and FF2 and, in accordance therewith, generates binary (zero or one) output signals F1–F4. In other words, the frequency decoder decodes the output of the increment/decrement counter.

The switching circuit 27 comprises: three switches designated S4, S5 and S6; and, three resistors designated R21, R22 and R23. F2 is applied to the clock (C) terminal of S4; F3 is applied to the clock (C) terminal of S5; and, F4 is applied to the clock (C) terminal of S6. The output of OA4 of the biquadratic filter is applied to the input (I) terminal of all of S4, S5 and S6. The output (O) terminal of S4 is applied through R21 to the noninverting input of OA2. The output (O) terminal of S5 is applied through R22 to the noninverting input of OA2; and, the output (O) terminal of S6 is applied through R23 to the noninverting input of OA2. It will be appreciated that the states of F2, F3 and F4 determine whether or not R21, R22 or R23 are connected between the output of OA4 and the noninverting input of OA2. This resistance change controls the resistance of the feedback circuit of OA1 and, thus, the center frequency of the biquadratic filter 11. Thus, as F2–F4 are changed as the status of the increment/decrement counter is changed, the center frequency of the biquadratic filter is changed. The change is a step change because as fixed resistances R21-R23 are switched into or out of the feedback circuit a step change occurs in the feedback impedance. The system is designed such that the step impedance change is toward the desired center frequency.

The enable flip-flop circuit 29 comprises a D flip-flop designated FF3. The D input of FF3 receives the $\overline{STOP}$ signal. The C input receives the $\overline{E}$ signal output of the phase state decoder 19. The set and reset inputs of FF3 are connected to −V. The $\overline{Q}$ output of FF3 is applied to the C input of S3 and to an output terminal designated ENABLE. The Q output of FF3 is unconnected.

In operation, when $\overline{STOP}$ reaches a zero state, the zero is clocked into FF3 upon the occurrence of the next $\overline{E}$ pulse, causing its $\overline{Q}$ output to achieve a one state. This one output causes the ENABLE terminal to achieve a one state and S3 to short out R14. During the next cycle of operation, the passband of the invention is narrowed because the rate of charging and discharging of C5 is increased. Assuming that STOP again achieves a zero state when the next Ē clock pulse occurs and continues to do so (indicating that the incoming tone lies in the narrow passband), ENABLE remains in a one state and downstream circuitry enables the reading of F1–F4. In other words, the downstream circuitry includes a timeout guard circuit that requires ENABLE to remain in a one state for a predetermined period of time (at least two cycles of operation of the invention) before F1–F4 are read.

It will be appreciated from the foregoing description of a preferred embodiment that the invention provides a new and improved tone detector suitable for use by telephone systems. The tone detector is electronically uncomplicated yet operates in a reliable manner to determine which tone of a series of tones exists in an incoming signal. By utilizing an increment/decrement counter, the system is adapted to readily step toward a state wherein coincidence between the center frequency of a biquadratic filter and the frequency of the incoming signal exists. Thus, the invention has a short capture time whereby stored energy in the filter is prevented from reaching undesirable high or low levels.

While a preferred embodiment of the invention has been illustrated and described, it will be appreciated that various changes can be made therein without departing from the spirit and scope of the invention. For example, increment/decrement counters, other than Johnson counters can be utilized, if desired. Further, the invention can be stepped by more than the number of steps provided by the illustrated embodiment of the invention and, thereby, operate over a wider range. Moreover, the invention is useful in environments other than telephone environments. In this regard, the invention is generally utilizable in any environment where it is desired to determine which tone of a plurality of tones exists in an incoming signal. Hence, the invention can be practiced otherwise than as specifically described herein.

The embodiments of the invention in which an exclusive property or privilege is claimed are defined as follows:

1. A step-servoed tone detector comprising:
   a bi-quadratic filter including an amplifier and an incrementally controllable impedance feedback path connected between the input and output of said biquadratic filter, each increment of said incrementally controllable impedance feedback path defining a biquadratic filter passband;
   a phase comparison system connected to said biquadratic filter so as to receive two signals, one of said two signals being an input signal applied to said biquadratic filter and the other of said two signals being the feedback signal of said biquadratic filter created by said applied signal, said phase comparison system comparing said two signals and generating an output indicative of the frequency relationship between said input signal and the passband of the biquadratic filter; and,
   a control system connected to said phase comparison system for receiving said output indicative of the frequency relationship between said two signals and connected to said biquadratic filter so as to control the impedance of the incrementally controllable impedance feedback path of said biquadratic filter, said control incrementally varying the impedance of said incrementally controllable impedance feedback path such that the center frequency of said biquadratic filter is incrementally moved toward the frequency of said signal applied to said biquadratic filter.

2. A step-servoed tone detector as claimed in claim 1 wherein said control system includes:
   an increment/decrement counter connected to said phase comparision system, said increment/decrement counter incrementing or decrementing in accordance with the frequency relationship between said two signals; and,
   a switching circuit, said switching circuit connected between the output of said increment/decrement counter and the controllable impedance feedback path of said biquadratic filter so as to incrementally vary the impedance of said controllable impedance feedback path of said biquadratic filter in accordance with the output of said increment/decrement counter.

3. A step-servoed tone detector as claimed in claim 2 wherein said phase comparison system includes:
   squaring means for squaring said two signals; and,
   a phase comparator for comparing the phase of said two squared signals, said phase comparator including an integrator having a feedback capacitor that is charged by one of said two squared signals and discharged by the other of said two squared signals.

4. A step-servoed tone detector as claimed in claim 3 wherein said squaring means comprises:
   first and second zero crossing detectors, one of said zero crossing detectors squaring one of said signals and the other of said zero crossing detectors squaring the other of said signals; and,
   first and second inverting means connected on a one-to-one basis to said first and second zero crossing detectors for inverting the outputs of said first and second zero crossing detectors whereby square waves related to said first and second signals, and their complements, are created.

5. A step-servoed tone detector as claimed in claim 4 wherein said phase comparison system also includes a phase state decoder connected to the outputs of said first and second zero crossing comparators and said first and second inverters for decoding the outputs thereof into two square waves related to said two signals, a control signal and a timing signal, said control and timing signals occurring once each cycle of said two signals.

6. A step-servoed tone detector as claimed in claim 5 wherein said phase comparator also includes a switch connected in parallel with said feedback capacitor of said integrator, said switch being operated by said control signal generated by said phase state decoder and further including amplifier means connected to said integrator to square the output thereof in a positive and negative manner so as to generate LO and HI signals indicative of the frequency relationship between said two signals.

7. A step-servoed tone detector as claimed in claim 6 wherein said control system also includes a gate circuit, said gate circuit connected to said phase comparator to receive said LO and HI signals and, in accordance therewith, control the operation of said increment/decrement counter in a manner such that the operation of said increment/decrement counter is disabled when said LO and HI signals achieve a predetermined common state when said timing signal created by said phase state decoder occurs, said timing signal being connected to said increment/decrement counter so as to clock said increment/decrement counter.

8. A step-servoed tone detector as claimed in claim 7 wherein said control system also includes an enable flip-flop connected to sense the output of said gate circuit and, in accordance therewith, control the charging rate of the integrator of said phase comparator.

9. A step-servoed tone detector as claimed in claim 1 wherein said phase comparison system includes a phase comparator for comparing the phase of said two signals, said phase comparator including an integrator having a feedback capacitor that is charged by one of said two signals and discharged by the other of said two signals.

10. A step-servoed tone detector as claimed in claim 9 wherein said phase comparator also includes a switch connected in parallel with said feedback capacitor of said integrator, said switch being closed once each cycle of said two signals.

11. A step-servoed tone detector as claimed in claim 9 wherein said control system includes:
an increment/decrement counter connected to said phase comparison system, said increment/decrement counter incrementing or decrementing in accordance with the frequency relationship between said two signals; and,
a switching circuit, said switching circuit connected between the output of said increment/decrement counter and the controllable impedance feedback path of said biquadratic filter so as to vary the impedance of said controllable impedance feedback path of said biquadratic filter in accordance with the output of said increment/decrement counter.

12. A step-servoed tone detector as claimed in claim 11 wherein said phase comparison system also includes a phase state decoder connected to receive said two signals and provide, in accordance therewith, two information signals related to said two signals, a control signal and a timing signal, said control and timing signals occurring once each cycle of said two information signals.

13. A step-servoed tone detector as claimed in claim 12 wherein said phase comparator also includes a switch connected in parallel with said feedback capacitor of said integrator, said switch being operated by said control signal generated by said phase state decoder so as to be closed once each cycle of said two signals.

14. A step-servoed tone detector as claimed in claim 13 wherein said control system also includes an enable means connected to sense the output of said phase comparator and, in accordance therewith, control the charging rate of the integrator of said phase comparator.

* * * * *